(No Model.)　　　　　　　　　　　　　　　　2 Sheets—Sheet 1.
J. MARTIGNONI.
CUTTER AND HOLDER THEREFOR.
No. 417,571.　　　　　　　　　Patented Dec. 17, 1889.
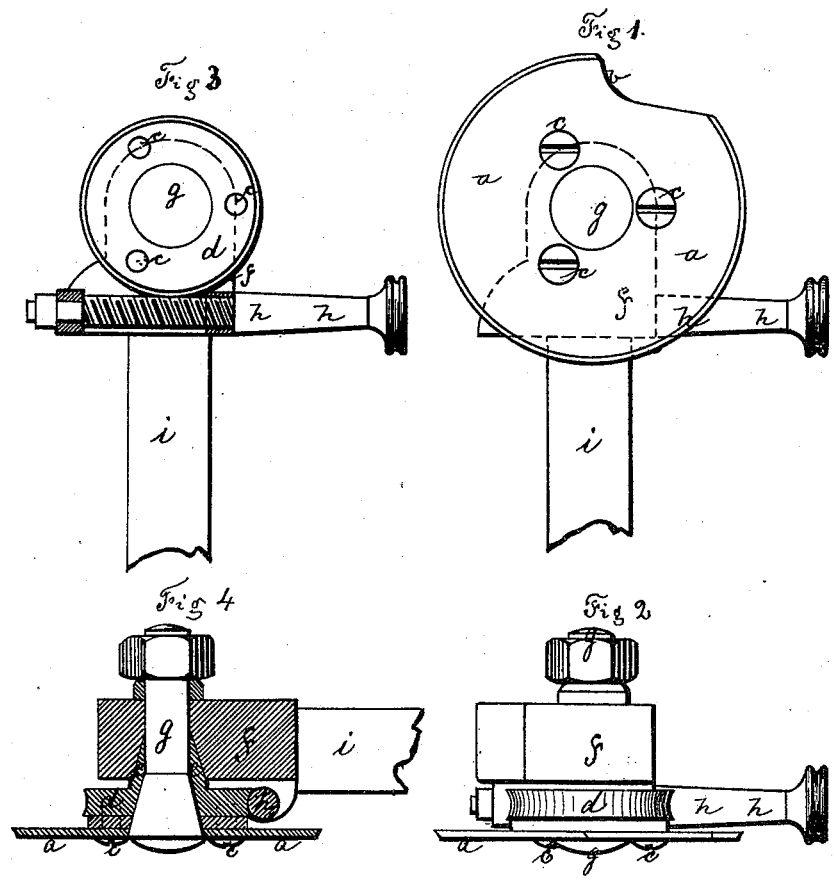

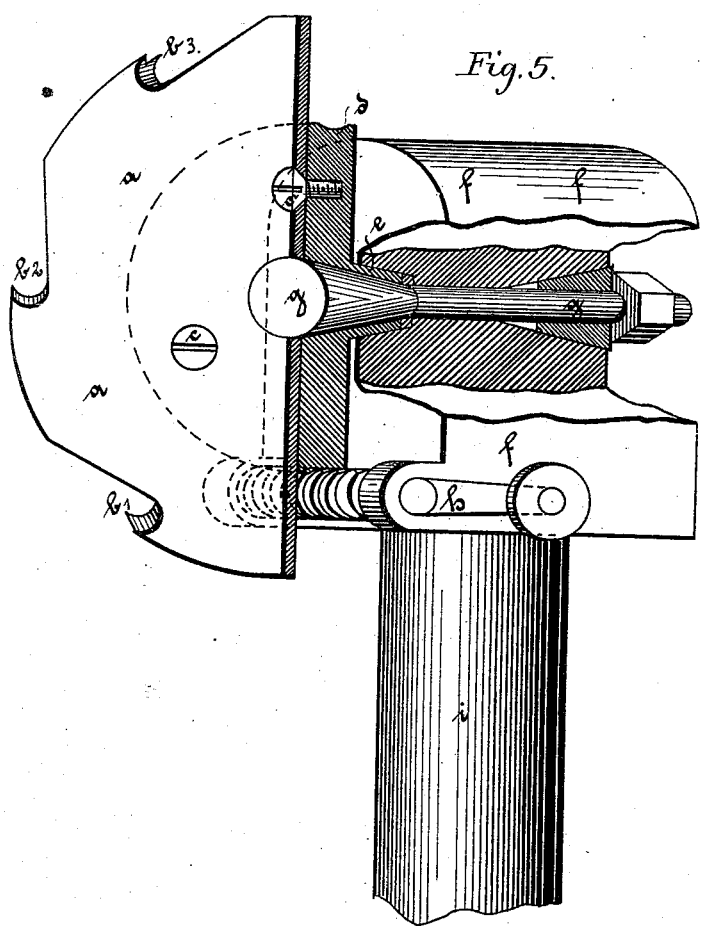

UNITED STATES PATENT OFFICE.

JOHANN MARTIGNONI, OF FRANKFORT, PRUSSIA, GERMANY.

CUTTER AND HOLDER THEREFOR.

SPECIFICATION forming part of Letters Patent No. 417,571, dated December 17, 1889.

Application filed July 3, 1888. Serial No. 278,971. (No model.)

*To all whom it may concern:*

Be it known that I, JOHANN MARTIGNONI, a subject of the King of Prussia, residing at the city of Frankfort, in the Kingdom of Prussia, Germany, have invented certain new and useful Improvements in Cutters and Holders Therefor; and I do hereby declare that the following is a full, clear, and exact description of the invention, which will enable others skilled in the art to which it appertains to make and use the same.

My invention relates to an improved turning, planing, and other cutting-machine tool.

It consists of a steel cutting-disk the circumference of which is recessed or interrupted at one or more points ground so as to form cutting-noses, of a worm-wheel and endless screw in connection with the cutting-disk, so that this latter may be turned round into any desired position, and of a holder to which the cutting-disk and worm-wheel are fixed by a screw-bolt, the said holder being provided with a shank or extension for fixing the tool to a rest, slide, or support of a lathe, planing-machine, or other cutting-machine.

In the accompanying drawings, Figure 1 is a side view of the tool of this invention; Fig. 2, a front end view thereof; Fig. 3, a part vertical section with the cutting-disk removed, showing the mechanism with which the same is in connection; Fig. 4, a part horizontal section; Fig. 5, a part sectional perspective view in which the cutting-disk $a$ has several noses $b$.

The cutting-disk $a$, formed with the ground nose part $b$, is fixed by screws $c$ to worm-wheel $d$, which is carried on screw-bolt $g$ in holder $f$. The latter is provided with a shank or extension $i$ for fixing the holder to a rest, slide, or support of a lathe, planing-machine, or other cutting-machine, so that the ground nose $b$ of the disk $a$ may serve as a cutting-edge. The endless screw $h$ engages in worm-wheel $d$, and serves for adjusting the disk $a$. It is mounted on holder $f$.

When the tool is to be used, the nose $b$ is adjusted to the proper position by operating endless screw $h$ and fixed in such position by tightening up screw-bolt $g$, so as to bring worm-wheel $d$, with disk $a$, firmly against holder $f$, the screw-bolt $g$ being for a part of its length conical to facilitate this operation.

The disk $a$ is of equal thickness and hardness throughout, and may therefore be used until almost worn away, the nose part $b$ only having to be ground when the cutting-edge gets blunt. In addition to the nose $b$, (shown in the drawings,) the disk $a$ may at the same time have other and differently-shaped noses $b'$ $b^2$ $b^3$, &c., thus rendering unnecessary the use of several different cutting-disks, as different forms of cut may be made by a different adjustment of the disk $a$ without removing it from the holder.

What I claim as my invention, and desire to secure by Letters Patent, is—

The disk $a$, provided with one or more cutting-noses, in combination with worm-wheel $d$ and endless-screw mechanism $h$, for the purpose specified, substantially as described and shown.

In testimony whereof I signed this specification in the presence of two subscribing witnesses.

JOHANN MARTIGNONI.

Witnesses:
  F. HOFFBAUER,
  FRAU ROESSLER.